United States Patent
Cooper, deceased et al.

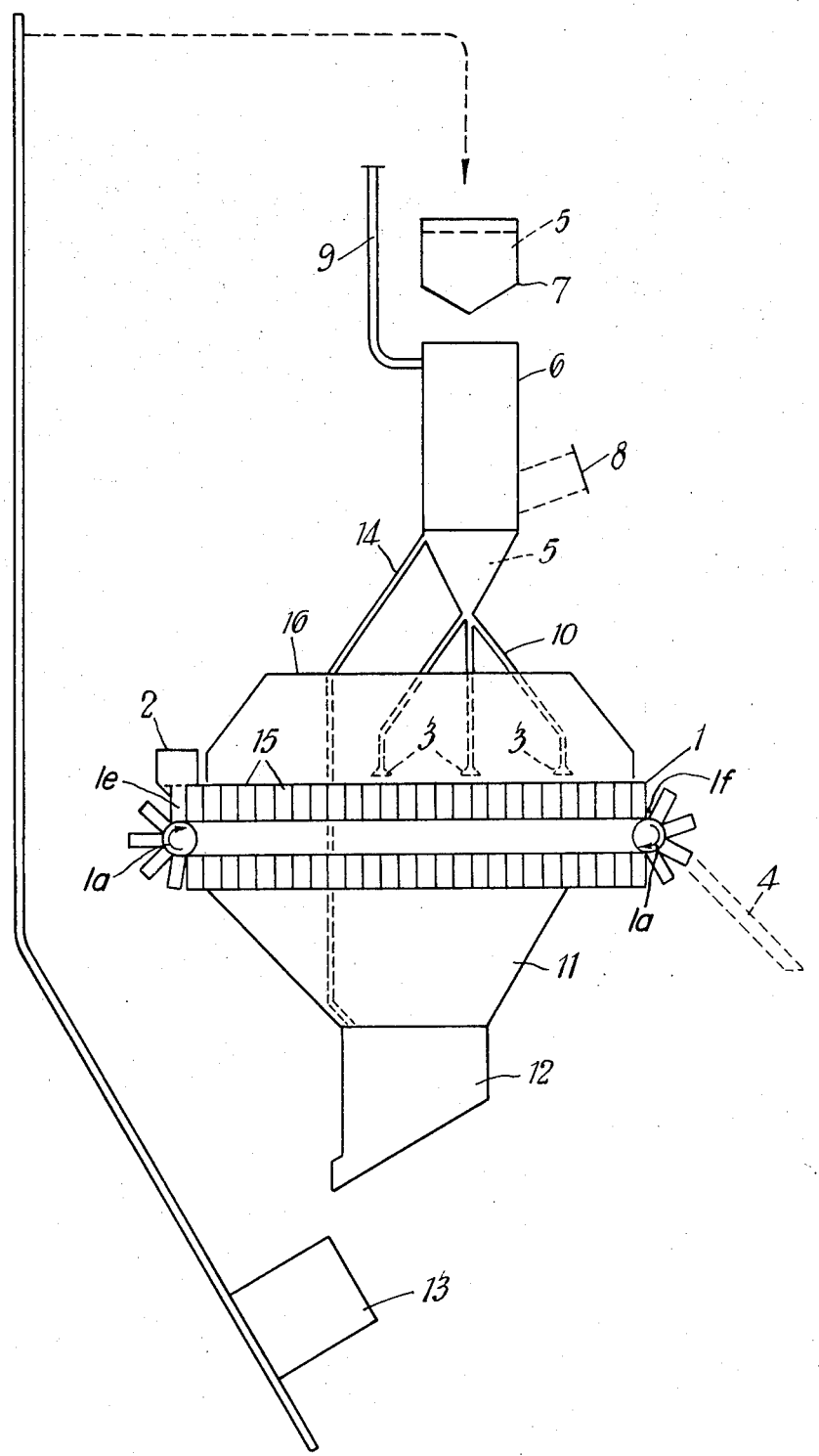

[15] 3,697,055
[45] Oct. 10, 1972

[54] HEAT TREATMENT OF BODIES OF COMBUSTIBLE MATERIAL

[72] Inventors: Cyril Walker Cooper, deceased, late of Pontefract, England; by Edgar Knight, executor, Leeds, England

[73] Assignee: Cawood Wharton & Company Limited, Yorkshire, England

[22] Filed: Sept. 18, 1970

[21] Appl. No.: 73,362

[52] U.S. Cl. ..................263/8 R, 165/104, 263/40 A
[51] Int. Cl. ..............................................F27b 9/24
[58] Field of Search..........263/8, 8 A, 40 A; 165/104

[56] References Cited

UNITED STATES PATENTS 2,872,386  2/1959  Aspegren...................165/104
3,053,704  9/1962  Munday....................263/40 A
3,477,703  11/1969 Tamalet.................165/104 X Primary Examiner—John J. Camby
Attorney—Larson, Taylor and Hinds

[57] ABSTRACT

A method of and apparatus for heat treating bodies of combustible material in which a bed of bodies is continuously moved by means of a conveyor which is capable of conveying the bed in such manner that the individual bodies do not move relatively to one another or to the conveyor and in which heated granular material is passed through the conveyed bed so as to transfer heat to the individual bodies.

6 Claims, 1 Drawing Figure

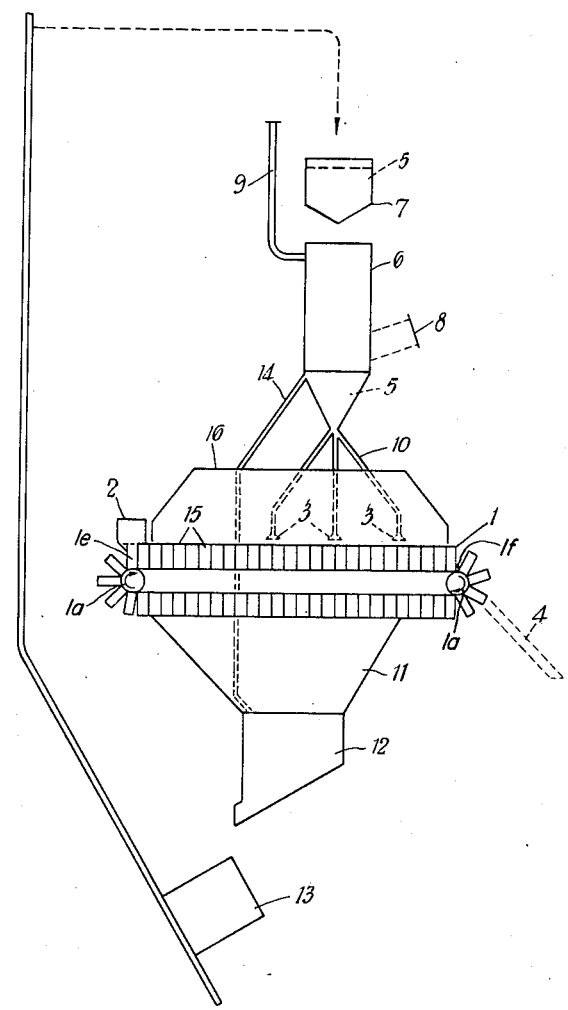

HEAT TREATMENT OF BODIES OF COMBUSTIBLE MATERIAL

BACKGROUND OF THE INVENTION

Field of the Invention

This invention relates to improvements in methods of and apparatus for heat treating bodies of combustible material.

The term "bodies of combustible material" as used herein includes within its ambit, pieces of coal, agglomerates of fine coal such as pitch-bound briquettes and egg-shaped ovoids, and any carbonaceous or other substance, for use as fuel.

Since the introduction of the Clean Air Act 1956 in the United Kingdom, the volatile content emitted during burning of such fuels must not exceed the maximum permissible chimney emission value. Thus the burning of such fuel is illegal in the United Kingdom unless it has been treated prior to burning to remove such an amount of the volatile content as to bring the amount of chimney emission below the specified value.

The main object of the present invention is to provide an improved method of and apparatus for heat treating bodies of combustible material.

SUMMARY OF THE INVENTION

According to one aspect of the present invention a method of heat treating bodies of combustible materials comprises continuously moving a bed of the bodies in such a manner that the individual bodies do not move relatively to one another and passing heated granular material through the continuously moving bed so as to transfer heat to the individual bodies.

Preferably, the granular material, after having been passed through the bed, is collected and recycled for reheating and reuse.

According to another aspect of the invention an apparatus for heat treating bodies of combustible material comprises a conveyor on which conveyor a bed of the bodies may be established and which is capable of conveying the bed in such a manner that the individual bodies do not move relatively to one another or to the conveyor, and means for passing heated granular material through the conveyed bed so as to transfer heat to the individual bodies.

Advantageously the conveyor is surmounted by an extraction hood for continuously removing the gaseous products given off during the heat treatment.

Preferably, said means comprise a number of spray nozzles which are directed towards the conveyor, which are disposed within the extraction hood and which are connected through pipe means to a heater, for the granular material.

Preferably, the conveyor is a continuous belt in the form of a grid to permit the passage of granular material therethrough and has attached overlapping side plates to permit the continuous formation of a bed of bodies to the desired thickness on the belt.

BRIEF DESCRIPTION OF THE DRAWING

In order that the invention may be more fully understood an embodiment in accordance therewith will now be described by way of example with reference to the accompanying flow diagram which illustrates an apparatus for heat treating bodies of combustible material.

DESCRIPTION OF THE PREFERRED EMBODIMENT

Referring to the flow diagram an apparatus for heat treating bodies of combustible material incorporates an endless conveyor 1, having drive means 1a on which conveyor a bed of untreated bodies can be continuously established during a heat-treating operation by means of a supply hopper 2 at a charging location 1e. The hopper 2 is charged with the untreated bodies from a source (not shown). The movement of the conveyor 1 is continuous along a path extending from the charging location 1e to a location 1f where treated bodies are discharged from the conveyor, the continuous movement of the conveyor being always unidirectional from the charging location 1e to the discharging location 1f as evidenced by the illustrated arrows. The conveyor and its movement enables continuous movement of the bed to take place, without movement of the individual bodies relatively to one another or to the conveyor 1.

In order to remove the fraction of volatile content, which gives rise to a chimney emission above the specified value when the untreated bodies are burnt, from the untreated bodies, a non-combustible heated granular material such as sand or grit is directed onto the upper surface of the continuous by moving bed by means of spray nozzles 3. The nozzles 3 are directed towards the conveyor 1 and are disposed within a fume extraction hood 16 mounted above the conveyor 1. The preferred granular material is sand and this word will be used for granular material hereinafter. The nozzles 3 spray the sand evenly onto the bed and, as the heated sand percolates by gravity through the continuous mass of the bed in interstices between the bodies 1 heat is transferred to the bodies which are thereby partially carbonized, a fraction of the volatile content being given off during the heat treatment. The gaseous products resulting from the heat treatment are continuously removed from the heat treatment zone by the fume extraction hood 16 for subsequent treatment and disposal.

A chute 4 is mounted at the downstream end of the conveyor 1, into which chute 4 the treated bodies are discharged from the conveyor. Any extraneous sand discharged with bodies is removed in the chute and is preferably recycled for reheating and reuse.

The treated bodies are then passed through a water bath (not shown) where they are quenched and are then discharged from the apparatus above the level of the water.

The sand, as indicated at 5 is fed to a heater 6 from a supply hopper 7 located above the heater, the hopper 7 being continuously recharged with sand during the heat treatment operation. The heater 6 is preferably fired with oil which is burnt in a combustion chamber 8, the heater heating the sand therein to a temperature in the region of 400° C. The sand heater 6 may be of cylindrical shape and is preferably made of steel with a lining of refractory material such as fire-brick. The products of combustion pass upwards through the heater 6 and are exhausted to atmosphere through a chimney 9. The heated sand 5 flows under the action of gravity through pipe means constituted by sand spray pipes 10 to the nozzles 3, which spray multiple streams of sand evenly over the bed of bodies on the continuously moving conveyor 1. The flow of sand is regulated by the size of the nozzles 3.

The conveyor 1 is a belt in the form of a grid so that after the sand has passed through the bed it falls through the belt, down a collecting chute 11 and into a collecting hopper 12. By virtue of the spray nozzles 3, the sand is continuously directed onto the upper surface of the bed and the openings defined by the grid of the conveyor permit the sand to pass continuously through, and be continuously removed from, the bed. The hopper 12 is intermittently opened to permit the collected used sand to fall into an automatic skip 13 which recycles the used sand to the hopper 7 for reheating and reuse. In order to prevent the heater 6 from becoming blocked with sand and to ensure continuity of supply an overflow pipe 14 connects the heater with the collection hopper 12, so that any sand surplus to requirements which is fed into the heater can be recycled to the supply hopper 7.

Advantageously, the conveyor 1 is fitted with overlapping side plates 15 in order that the untreated bodies may be formed into a bed of predetermined thickness by the hopper 2.

The apparatus described is particularly useful in heat treating pitch bound briquettes and egg-shaped ovoids. By virtue of there being no movement of the individual briquettes or ovoids relative to one another and to the conveyor belt or side plates during heat treatment, when the binder in the ovoids or briquettes is in a plastic state, the briquettes or ovoids are not subjected to physical stress, thereby substantially eliminating deformation and breakage.

I claim:

1. A method of heating treating bodies of combustible material, said method comprising the steps of:
   a. effecting continuous movement of an endless conveyor for the bodies, the conveyor having side plates, along a path extending from a location where the conveyor is charged with the bodies to a location where treated bodies are discharged from the conveyor, the continuous movement of the conveyor along the path being always unidirectional from the charging location to the discharging location,
   b. continuously feeding the bodies onto the endless conveyor at said charging location so as to form a bed of bodies to a predetermined thickness on the conveyor, the conveyor and its movement enabling continuous movement of the bed of bodies to take place without movement of the individual bodies relative to one another or to the conveyor, and
   c. continuously directing heated granular material onto the upper surface of the continuously moving bed whereby said heated granular material continuously passes by gravity through the bed in interstices between the bodies so as to transfer heat to the individual bodies and whereby used granular material continuously passes out of the bed through the endless conveyor so that the used granular material is continuously removed from the bed.

2. An apparatus for heat treating bodies of combustible material, said apparatus comprising:
   a. an endless conveyor defining a plurality of openings and on which a bed of the bodies may be established,
   b. means for continuously moving the endless conveyor along a path extending from a location where the conveyor is charged with the bodies to a location where treated bodies are discharged from the conveyor, the continuous movement of the conveyor along said path being always unidirectional from the charging location to the discharging location,
   c. means for continuously feeding the bodies onto the conveyor so as to establish a bed of bodies to a predetermined thickness thereon, the conveyor and its movement resulting in continuous movement of the bed without movement of the individual bodies relative to each other or to the conveyor, and
   d. means for continuously directing heated granular material onto the upper surface of the conveyed bed whereby said heated granular material continuously passes by gravity through the bed in interstices between the bodies so as to transfer heat to the individual bodies, the openings in the conveyor permitting used granular material to continuously pass therethrough and thereby be continuously removed from the bed.

3. An apparatus as set forth in claim 2, wherein the conveyor is surmounted by an extraction hood for continuously removing gaseous products given off during the heat treatment.

4. An apparatus as set forth in claim 3, wherein the said means for directing heated granular material comprise a number of spray nozzles which are directed towards the conveyor, which are disposed within the extraction hood and which are connected through pipe means to a heater, for the granular material.

5. An apparatus as set forth in claim 2, wherein the conveyor is a continuous belt in the form of a grid and has attached overlapping side plates.

6. An apparatus as set forth in claim 5, wherein a hopper is provided for collecting and discharging the granular material after it has passed through the conveyor.

* * * * *